United States Patent [19]

Schulte

[11] Patent Number: 5,377,491
[45] Date of Patent: Jan. 3, 1995

[54] COOLANT RECOVERY PROCESS

[75] Inventor: Thomas R. Schulte, Grand Island, N.Y.

[73] Assignee: Praxair Technology, Inc., Danbury, Conn.

[21] Appl. No.: 989,392

[22] Filed: Dec. 11, 1992

[51] Int. Cl.$^6$ .............. F25D 13/06; C03B 25/00; F24F 3/16
[52] U.S. Cl. ............................ 62/63; 62/78; 62/265; 62/322; 65/510
[58] Field of Search ............ 62/63, 65, 78, 118, 62/265, 266, 270, 322, 408, 529; 65/12

[56] References Cited

U.S. PATENT DOCUMENTS

| | | | |
|---|---|---|---|
| 4,437,870 | 3/1984 | Miller | 65/12 |
| 4,514,205 | 4/1985 | Darcangelo et al. | 65/12 |
| 4,664,689 | 5/1987 | Davis | 65/12 X |
| 4,761,168 | 8/1988 | Blyler, Jr. et al. | 65/3.1 |
| 4,817,391 | 4/1989 | Roe et al. | 62/78 X |
| 4,829,774 | 5/1989 | Wassibauer et al. | 62/78 |
| 4,838,918 | 6/1989 | Vaughan et al. | 65/12 |
| 4,913,715 | 4/1990 | Jochem et al. | 65/12 X |
| 4,966,615 | 10/1990 | Linden et al. | 65/12 |
| 4,982,512 | 1/1991 | McClenny | 62/50.2 |

FOREIGN PATENT DOCUMENTS

| | | | |
|---|---|---|---|
| 0079186 | 5/1983 | European Pat. Off. | |
| 1723059 | 3/1992 | U.S.S.R. | 65/12 |
| 8302268 | 7/1983 | WIPO | 65/12 |

*Primary Examiner*—Christopher Kilner
*Attorney, Agent, or Firm*—Chung K. Pak

[57] ABSTRACT

A system and process for recovering high purity coolant gas from at least one fiber optic heat exchanger, characterized by controlling a flow of coolant gas into and out of the heat exchanger using a pressure, impurity and/or flow rate monitoring or transmitting means in conjunction with a flow adjusting or controlling device to limit air or other gas infiltration into at least one fiber optic passageway of the heat exchanger. A sealing means may also be used at at least one end of the fiber optic passageway to further reduce air or other gas infiltration into the passageway. The resulting high purity coolant gas from the outlet of the heat exchanger is delivered to the inlet of the heat exchanger. Optionally, the resulting coolant gas from the outlet of the heat exchanger may be cooled, filtered and/or purified before being delivered to the inlet of heat exchanger.

6 Claims, 4 Drawing Sheets

COOLANT RECOVERY PROCESS

FIELD OF THE INVENTION

The present invention relates in general to coolant gas recovery systems, more particularly to helium recovery systems associated with optical fiber cooling means.

BACKGROUND OF THE INVENTION

In the production of optical fibers, a glass rod or preform, which is especially made to manufacture optical fibers, is processed in an optical fiber drawing system. The optical fiber drawing system generally comprises a furnace, a heat exchanger, a coating applicator, a dryer or curing furnace and a spool as shown by European Patent Application No. 0,079,188. Initially, the glass rod or preform is melted in the furnace to produce a small semi-liquid fiber. The semi-liquid fiber is then cooled and solidified as it falls through the air and through the heat exchanger. The cooled and solidified fiber from the heat exchanger is coated in the coating applicator, dried in the curing furnace or dryer and drawn with the spool.

The drawing rate of the optical fiber is dependent on the cooling rate of the optical fiber in the heat exchanger. That is, the rate at which the fiber can be withdrawn can be increased as the rate of cooling increases. To increase the rate of cooling, a coolant gas, such as helium or nitrogen, is normally introduced into the heat exchanger to directly cool the semi-liquid fiber by direct heat exchange. The direct heat exchange is made possible by designing the heat exchanger to provide a passageway or cylindrical hole running from the top to the bottom for passing the optical fiber, an inlet for introducing the coolant into the passageway or cylindrical hole and optionally at least one outlet for removing the coolant from the passageway or cylindrical hole. The flow of the coolant into the heat exchanger is usually controlled with metering valves and flow meters.

Although the drawing rate of the optical fiber is increased through employing the above heat exchanger, the coolant utilized is normally lost to the atmosphere through one or both ends of the passageway or cylindrical hole and/or the outlet, and is also contaminated with impurities, e.g., when air impurities infiltrate into the passageway or cylindrical hole where the coolant is located. Replacing this lost coolant gas represents a substantial cost to the optical fiber manufacturing process. Thus, there is a need for an effective and efficient coolant recovery system and heat exchanger, which could reduce the coolant losses and reduce the contamination of the coolant.

SUMMARY OF THE INVENTION

The present invention is in part drawn to a recovery system which is useful for recovering coolant gas efficiently and effectively. The recovery system comprises:

(a) at least one heat exchanger having at least one passageway capable of passing at least one hot fiber, at least one inlet for passing coolant gas into said at least one passageway and at least one outlet for recovering coolant gas from said at least one passageway;

(b) means for pumping coolant gas from said outlet of the said at least one heat exchanger to said inlet of said at least one heat exchanger;

(c) means for monitoring and/or transmitting the flow rate of a coolant gas from the outlet of said at least one heat exchanger, the concentration of impurities in a coolant gas from the outlet of said at least one heat exchanger and/or the pressure of a coolant gas from the outlet of at least one heat exchanger; and (d) means for controlling the flow of a coolant gas into and out of said at least one heat exchanger based on the monitored and/or transmitted value to limit air or other gas infiltration into said at least one passageway of said at least one heat exchanger.

At least one volume for damping surges in coolant gas flow may be provided prior to the means for pumping a coolant gas to better control the pressure and/or flow of a coolant gas delivered to the means for pumping. The coolant gas derived from the means for pumping may be cooled with cooling means, may be filtered with filtering means and/or may be purified in a purification system before it enters the inlet of at least one heat exchanger. At least one of the cooling means employed may be incorporated into at least one heat exchanger.

The present invention is also drawn to a heat exchanger system which is useful for improving the recovery of coolant gas in the above coolant recovery system. The heat exchanger system comprises:

(a) at least one passageway capable of passing therethrough at least one hot fiber, said at least one passageway having at least two end openings;

(b) at least one inlet for introducing coolant gas into said at least one passageway:

(c) at least one outlet for recovering coolant gas from said at least one passageway; and (d) means for monitoring and/or transmitting the flow rate of a coolant gas from the outlet of said at least one heat exchanger, the concentration of impurities in a coolant gas from the outlet of said at least one heat exchanger and/or the pressure of a coolant gas from the outlet of at least one heat exchanger; and (e) means for controlling the flow of a coolant gas into and out of said at least one heat exchanger based on the monitored and/or transmitted value to limit air or other gas infiltration into said at least one passageway of said at least one heat exchanger.

In the vicinity of at least one of the end openings of the passageway, sealing means may be placed. The sealing means is designed to minimize or reduce the infiltration or egress of gases into or out of the passageway but allow the passage of at least one hot fiber. The sealing means may be selected from the group consisting of labyrinth seals, gas seals, mechanical seals, tolerance seals and/or liquid seals. In lieu of the sealing means, a furnace for melting a glass rod or preform and a coating applicator may be sealed onto the top and bottom of the heat exchanger, respectively, to minimize air infiltration and enhance the recovery of coolant gas.

As used herein the term "at least one hot fiber" means one or more of any fiber which needs to be cooled.

As used herein the term "in the vicinity of" means a surrounding area of a designated point or location. Typically, it covers an area between the coolant gas outlet and the closest end opening in the heat exchanger and/or between the coolant gas inlet and the closest end opening in the heat exchanger.

As used herein the term "coolant gas" means any gas capable of cooling hot optical fibers.

As used herein the term "mechanical seal" means any mechanical device that seals the end openings of a passageway or provides sealing means in the vicinity of the end openings of the passageway by direct contact with at least one fiber passing through the passageway.

As used herein the term "tolerance seals" means any feature that can be used to reduce the end openings of a passageway or reduce the passageway in the vicinity of the end openings with minimum or no contact with at least one fiber which goes through the passageway.

As used here the term "gas impurities" means any gas other than a coolant gas.

As shown by the above figures, there are several preferred embodiments which are useful for recovering the coolant gas with the reduced contamination. These preferred embodiments, however, in no way preclude other embodiments which will become apparent to those skilled in the art after reading this disclosure.

DETAILED DESCRIPTION OF THE INVENTION

Figure 1:
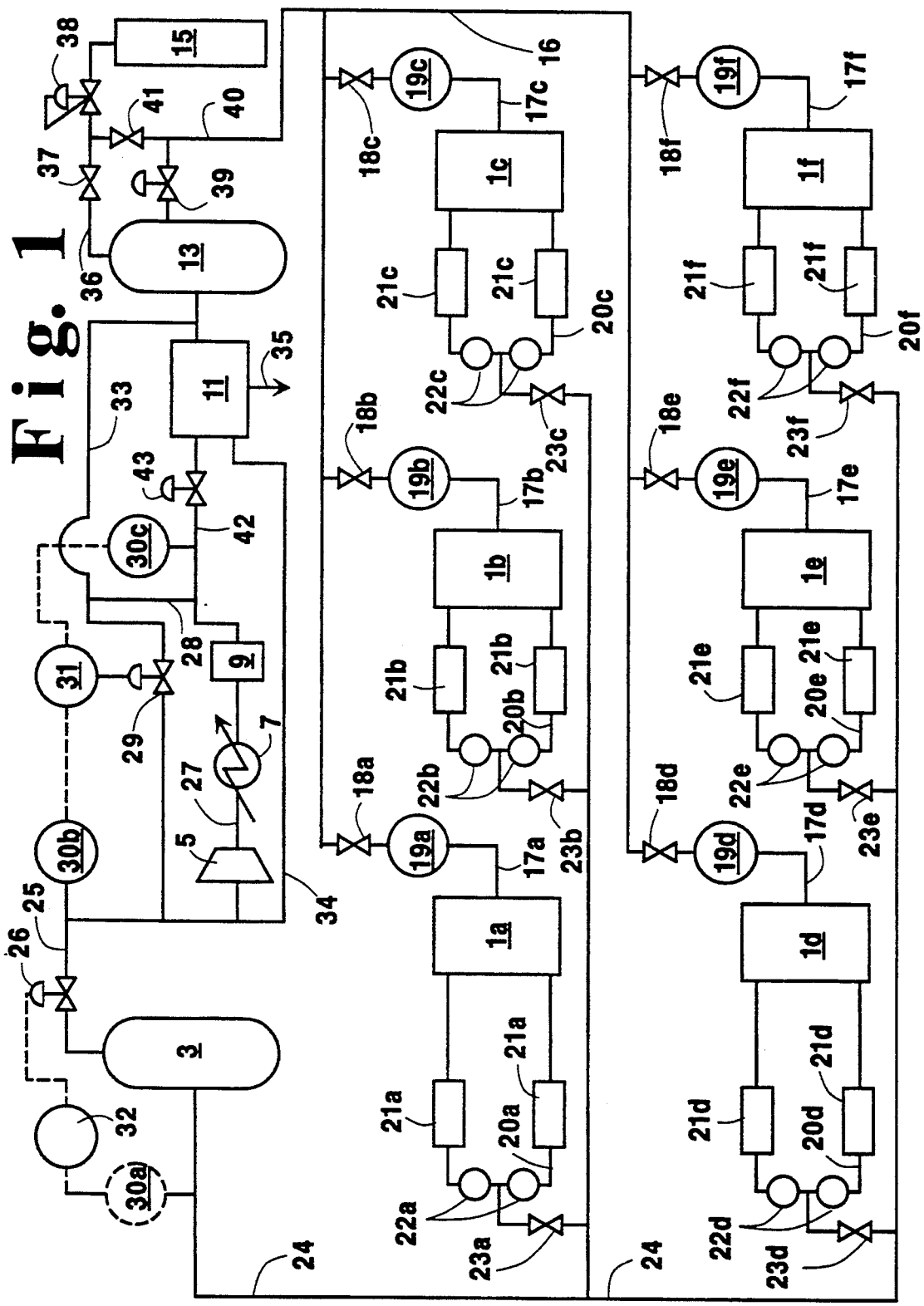
FIG. 1 shows a schematic diagram of a coolant recovery system which is one embodiment of the present invention.

Referring to FIG. 1, there is illustrated a schematic diagram of a coolant gas recovery system. The coolant gas recovery system comprises, among other things, a plurality of heat exchangers ($1(a)$ to $1(f)$), at least one collector vessel (3), at least one compressor (5), at least one cooling means (7), at least one filtering means (9), at least one purification system (11), at least one product vessel (13) and at least one coolant storage tank (15). The coolant recovery system may be coupled to any conventional optical fiber drawing system which utilizes at least one of the heat exchangers ($1(a)$–$1(f)$).

Figure 2:
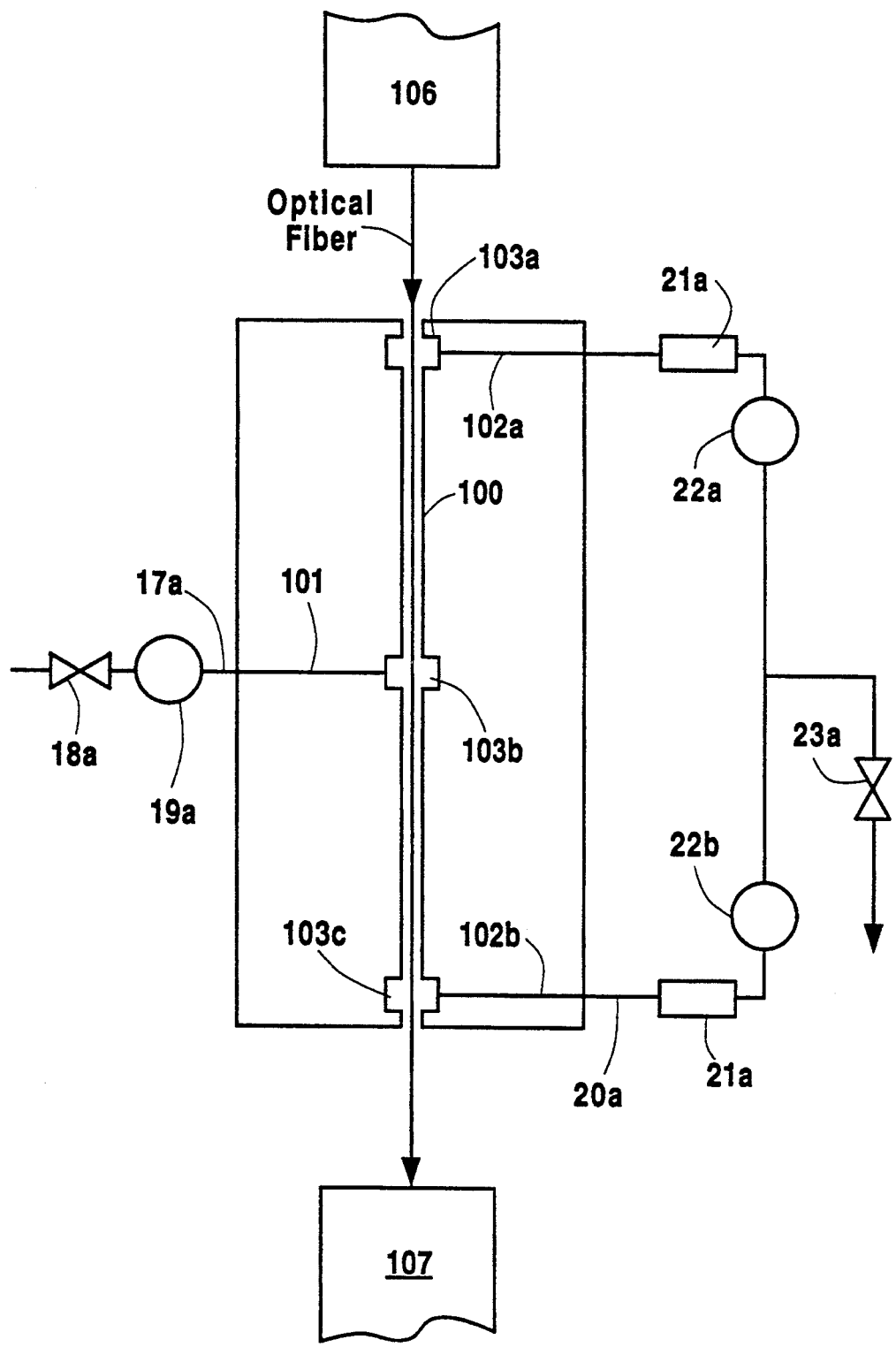
FIG. 2 shows a heat exchanger and a recovery conduit having at least one monitoring and/or transmitting means and at least one controlling means, which are one embodiment of the present invention.
Figure 3:
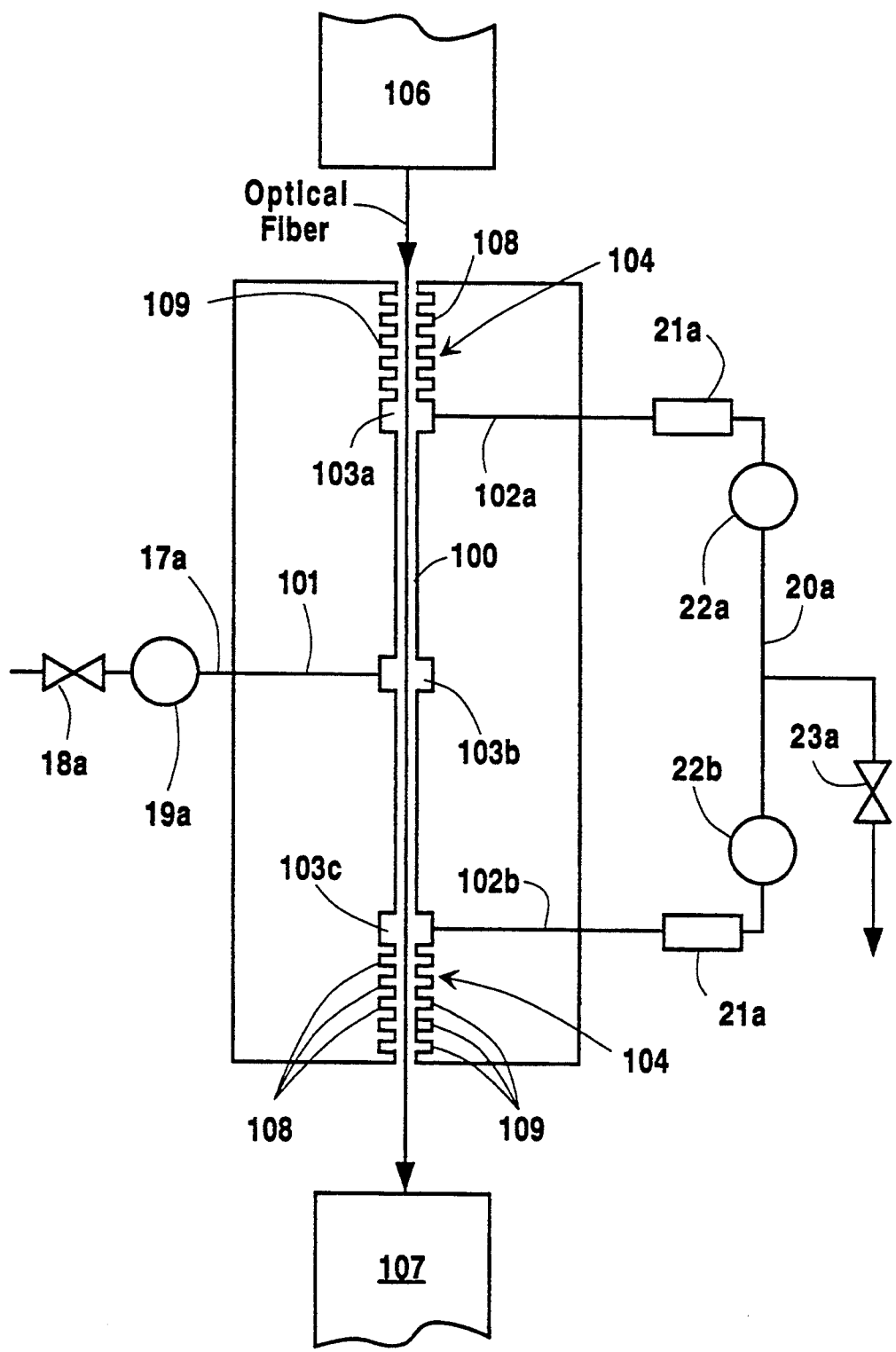
FIG. 3 shows a heat exchanger having labyrinth seals, which is one embodiment of the present invention.
Figure 4:
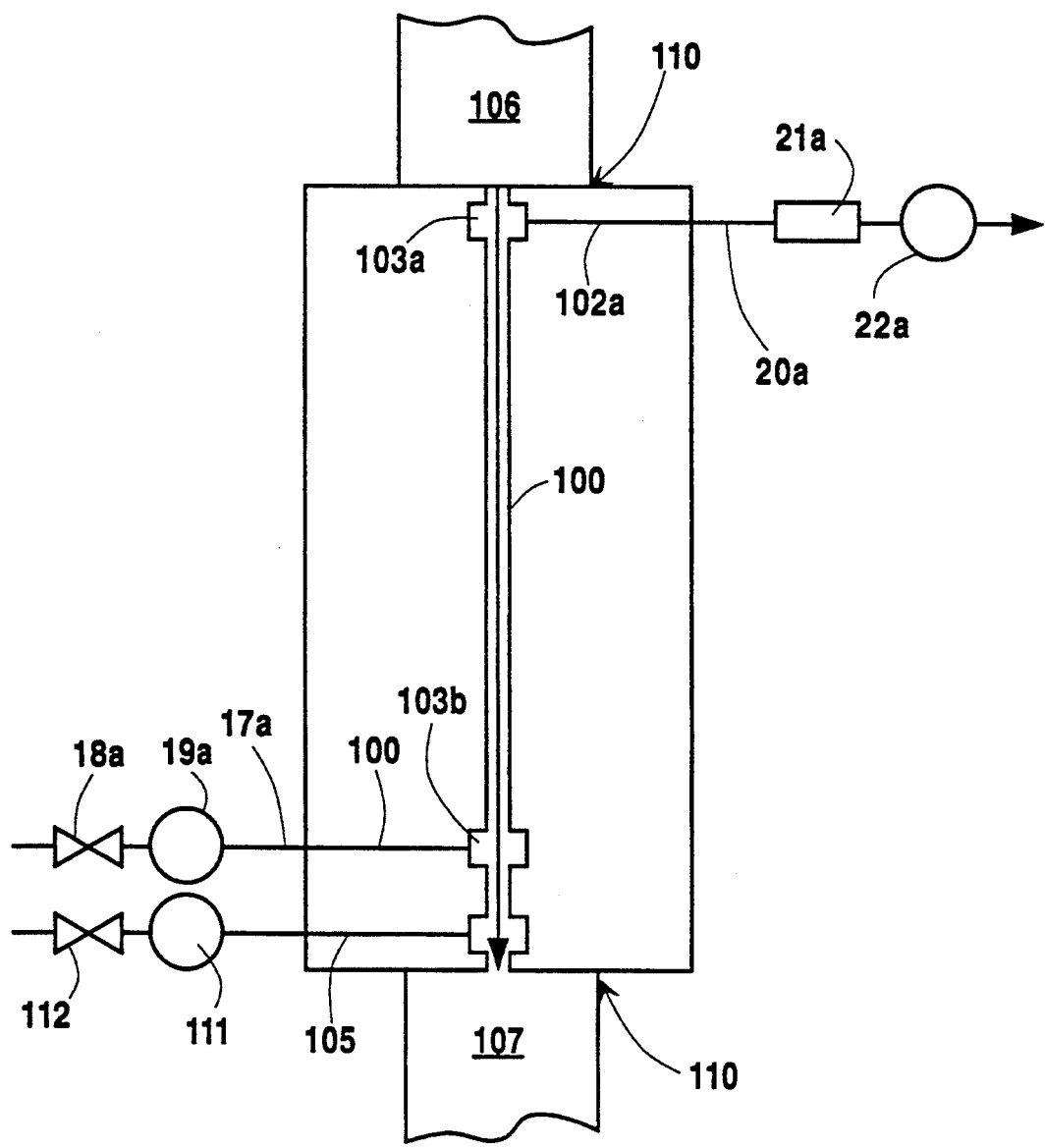
FIG. 4 shows a furnace and coating applicator which are attached to the top and bottom of the heat exchanger.

As shown by FIGS. 2–4, at least one of the heat exchangers ($1(a)$–$1(f)$) has at least one passageway (100) capable of passing therethrough a fiber, at least one inlet (101) for introducing a coolant gas into the passageway (100) and at least one outlet ($102(a)$ and/or $102(b)$) for recovering or removing the coolant gas from the passageway (100). The passageway (100), which normally runs through the top to the bottom of the heat exchanger to cause the end openings to be present at the top and the bottom, may have expanded cross-sectional areas at certain locations ($103(a)$–$103(c)$) along its length. The expanded cross-sectional area may directly communicate with the inlet (101) and outlet ($102(a)$ and/or $102(b)$) so that a large volume of a coolant gas can be recovered or introduced into the passageway (100). These expanded areas ($103(a)$–$103(c)$) may be located at the mid section of the passageway (100) and/or in the vicinity of the end openings of the passageway (100). Depending on the location, the coolant gas can be fed into the passageway (100) in a desired manner, e.g., countercurrently with respect to the direction of a fiber, since the coolant is fed to or recovered from these areas.

In the vicinity of the end openings of the passageway (100), preferably between the end openings and the outlet ($102(a)$ or $102(b)$) closest to the end openings, at least one sealing means (104) may be located. The sealing means (104) minimizes or reduces the infiltration and/or egress of gases into and/or out of the passageway (100) through the end openings and, at the same time, provides an opening or openings sufficient to pass a fiber through the passageway (100). The preferred sealing means may be selected from labyrinth seals, gas seals, mechanical seals, tolerance seals and/or liquid seals. Of these preferred sealing means, a labyrinth seal may be useful because it increases the pressure drop in the gas flow path between the end openings and the outlet closest to the end openings by a series of expansions (108) and contractions (109). In certain circumstances, a fluid seal may be advantageously utilized. To use a fluid seal, such as air, nitrogen or carbon dioxide, however, at least one additional inlet (105), which is in fluid communication with the passageway (100), may be needed. The flow of the fluid seal may be controlled with a flow meter (111) and a valve (112). As used herein the term "fluid seal" means adding a fluid into the passageway at a point between the coolant gas inlet and the closest end opening of the passageway and/or between the coolant gas outlet and the closest end opening of the passageway to alter a flow distribution and/or pressures inside of the passageway to increase the recovery of the coolant gas and/or decrease the infiltration of contaminants.

It is understood that the heat exchanger can be designed to provide features which are functionally equivalent to the sealing means or features which can accommodate a combination of the above sealing means. For example, a furnace (106) for melting a glass rod or preform and a coating applicator (107) for coating a fiber may be sealed onto the top and bottom of the heat exchanger, respectively, with or without a sealing means (110) since the heat exchanger is commonly used between the furnace (106) and the coating applicator (107) in the conventional optical fiber drawing systems. To this arrangement, additional sealing means, such as a gas seal, may also be used to further reduce air or other gas infiltration into the passageway.

Initially, the coolant gas is introduced into a plurality of the heat exchangers at about 0 to about 150 psig. The coolant gas, albeit can be derived from any source, is derived from the storage tank (15). From the storage tank (15), the coolant gas flows through, among other things, a branch conduit (16) and a plurality of coolant feed conduits ($17(a)$–$17(f)$) which are in fluid communication with the inlets of the heat exchangers. The coolant feed conduits have metering valves ($18(a)$–$18(f)$) and flow meters ($19(a)$–$19(f)$), which are useful for controlling the flow of the coolant gas into the heat exchanger. The coolant gas employed may be at least one of helium, nitrogen, hydrogen, carbon dioxides, etc. Of these coolant gases, a gas containing at least about 80% by volume helium is normally preferred.

As the coolant gas enters the heat exchangers, i.e., passageways, it flows toward the outlets of the passageways. The outlets of the passageways are connected to recovery conduits ($20(a)$–$20(f)$). At least one of the recovery conduits has means ($22(a)$–$22(f)$) for monitoring and/or transmitting the flow rate of a coolant gas from the outlet of said at least one heat exchanger, the concentration of impurities in a coolant gas from the outlet of said at least one heat exchanger and/or the pressure of a coolant gas from the outlet of at least one heat exchanger and means (21(a)–21(f)) for controlling the flow of a coolant gas into and out of said at least one heat exchanger based on the monitored and/or transmitted value to limit air or other gas infiltration into said at least one passageway of said at least one heat exchanger. The means for monitoring and/or transmitting may be selected from flow meters, pressure sensors, impurity or gas analyzers (oxygen analyzer) and/or any known means while the means for controlling may be at least one flow resistance means, such as valves, orifices, sintered filters, narrow pipes having smaller diameters than the recovery conduit or packed beds. The adjustment of the flow resistance means can be made manually or automatically based on the flow rate, pressure and/or composition of a coolant gas in each recovery conduit. Alternatively, the flow resistance means can be preset or preadjusted based on experience and calculation or based on the flow rate, pressure and/or composition of a coolant gas in each recovery conduit. In operation, the composition of a coolant gas may be determined by ascertaining the concentration of oxygen in the coolant gas with an oxygen analyzer. On the other hand, a coolant gas flow rate and pressure may be determined by using a flow meter and a pressure sensor, respectively. By adjusting the flow resistance means, such as metering valves, to control the pressure in the vicinity of the outlets, i.e., locations in the passageway, which directly communicates with the outlets, the improved recovery of the coolant gas may be obtained without substantial contamination. Generally, greater than about 50% of the coolant gas can be recovered using this arrangement. Any remaining coolant is normally allowed to flow out of the end openings of the passageways to limit air or other fluid contamination, or air or other gas infiltration into the passageways. Of course, if the sealing means or equivalents thereof is used in conjunction with this arrangement, the recovery of the coolant gas can be further improved since a smaller amount of the coolant gas is needed to prevent or reduce air or other fluid contamination. The labyrinth seal, for example, increases the pressure drop in the gas flow path between the end openings and the outlet closest to the end openings by creating or providing a series of expansions and contraction. If the air or other fluid contamination cannot be eliminated, one or some of the solenoid or other valves (23(a)–23(f)) may be used to isolate the highly contaminated coolant gas from particular heat exchangers, or a purification system (11) may be used to remove one or more fluid contaminants. Also, the purification system can be used to allow higher levels of the coolant gas recovery by removing contaminants that may flow into the heat exchanger during the higher coolant gas flow or higher coolant recovery rate.

The recovered coolant gas in the recovery conduits is allowed to flow into a volume for dampening surges in a coolant gas flow, which may be a recovery branch conduit (24) or an optional gas collection vessel (3). If the recovery branch conduit (24) is used as the volume for dampening surges in the coolant gas flow, its length and internal diameter, which are dependent on the volume of the coolant gas from the recovery conduits, should be properly sized to damp surges in the coolant gas flow. The use of the optional gas collection vessel (3), however, is normally preferred because it may also be useful for reducing pressure fluctuations and enhancing coolant gas flow control.

From the recovery conduit (24) and/or from the gas collection vessel (3), the coolant gas flows to means for pumping the coolant gas (5), such as a recovery compressor, through a conduit (25) having a valve (26). The means for pumping the coolant gas compresses the coolant gas from a slight vacuum (typically about 5 to about 14.6 psia) to a pressure sufficient for recirculation (typically about 5 to 250 psig). The compressed coolant gas flows into optional cooling means (7) through a conduit (27). In the cooling means, the compressed coolant gas is cooled. After cooling, oil, water and/or particulate may be removed from the coolant gas via optional filtering means (9).

At least a portion of the compressed coolant gas which may have been or may not have been cooled and/or filtered may be automatically recycled to the means for pumping the coolant gas through a recycle conduit (28) having a valve (29), or through the recycle conduit (28) having the valve (29) and a portion of the conduit (25). The recycle conduit is useful for controlling the pressure in the volume for dampening surges in the coolant gas flow, e.g., the gas collector vessel, and for controlling the flow rate of the coolant gas. At least one means (30(a)–30(c)) for monitoring the pressure condition of the volume, the flow rate of the coolant gas derived from the volume and/or the purity level of the coolant gas in the volume may be utilized to adjust the valve(s) (26 and/or 29) or other equivalent flow resistance means (not shown) in order to control the flow rate of the coolant and the pressure in the volume, e.g., the vessel (25). A means for transmitting the monitored value may be installed in the means (30(a)–30(c)) so that the valves (26 and/or 29) or other equivalent flow resistance means can be automatically adjusted with control means (31) and/or (32) based on the monitored and/or transmitted conditions to control the pressure in the volume, e.g., the vessel (25) and the flow rate of the coolant gas from the volume, e.g., the vessel (25). The control may be done manually or automatically using electronic, pneumatic or hydraulic signals.

The remaining portion of the compressed coolant gas may be sent to the optional purification system (11) through a conduit (42) having a valve (43). The optional purification system may be selected from, inter alia, filtration systems, solid and fluid separation systems, cryogenic liquid upgrading systems, chemical adsorption systems, catalytic reaction systems, absorption systems, membrane separation systems and/or pressure and/or thermal swing adsorption systems. Of these systems, the membrane separation systems and pressure and/or thermal swing adsorption systems are preferred because the purified coolant gas, such as helium, need not be highly pure in cooling at least one hot fiber. Of course, cryogenic gas separation systems can be also useful because the purified coolant gas need not be further cooled. These systems may be or may not be used with a dryer depending on the moisture level of the coolant gas entering the purification system.

In the desired membrane purification system, the purification of the compressed coolant gas may be carried out as indicated below. Initially, the compressed coolant gas may be fed to at least one membrane module to produce a waste stream and a product stream. The non-permeated stream may be used as the waste stream while the permeated stream is used as the product stream. The recovered product stream is delivered to a plurality of the heat exchangers directly or through optional product vessel (13) and the branch conduit (16). An optional compressor (not shown) may be used to deliver the product stream to the heat exchangers. If necessary, at least a portion of the product stream can be recycled back to the means for pumping the coolant gas through a conduit (33) to control the pressure in the volume, e.g., the vessel (3). In the meantime, the waste stream may be treated with additional membrane modules to produce second product streams. The second product streams may be recycled to the means for pumping the coolant gas through a conduit (34) if their purity levels are sufficiently high. If not, they may be treated with other purification means, such as an optional dryer, before they are sent to the means for pumping the coolant gas, or they may be discarded through a conduit (35). Additional membrane stages may be used to increase the recovery of the coolant gas and/or the purity of the coolant gas.

The compressed coolant gas, which may have been or may not have been cooled, filtered and/or purified, is delivered to the product vessel (13). The product vessel may be useful for reducing pressure fluctuations and/or improving the control of a coolant gas flow rate. To this product vessel, a makeup coolant gas may be delivered from the storage tank (15) through a conduit (36) having valves (37 and 38) to combine with the compressed coolant gas to makeup for any lost coolant gas. The combined stream is delivered to the heat exchangers through a conduit (16) having a valve (39). The stream may be cooled with additional cooling means (not shown) before it is introduce into the heat exchangers and/or may be cooled with additional cooling means (not shown) which may have been incorporated or integrated into the heat exchangers. The integrated cooling means may be one or more additional passageways or reservoirs in the heat exchangers. By filling these passageways or reservoirs of the heat exchangers with liquid nitrogen, liquid helium, liquid argon and like, the coolant gas in the passageways for passing at least one fiber can be cooled by indirect heat exchange.

When the concentration of impurities, e.g., the concentration of oxygen, in the recovered coolant gas from the heat exchanger exceeds the allowable limit (typically about 1 mole % to about 50 mole %), the makeup coolant gas is directly delivered to the heat exchangers through a conduit (40) having a valve (41). Meanwhile, the recovery system associated with recovering the coolant gas from the outlets of the heat exchangers can be isolated or shut down to reduce or prevent the contamination of the coolant gas. Of course, the coolant gas can always be directly delivered to the heat exchangers if the recovery system is shut down for any other reasons.

Although the coolant recovery system of the present invention has been described in detail with reference to certain embodiments, those skilled in the art will recognize that there are other embodiments of the invention within the spirit and scope of the claims.

What is claimed is:

1. A process for recovering a coolant gas from a fiber optic cooling heat exchanger, said process comprising:
    (a) providing at least one heat exchanger having at least one passageway capable of passing therethrough at least one hot fiber, at least one inlet for passing said coolant gas into said at least one passageway and at least one outlet for removing said coolant gas from said at least one passageway;
    (b) introducing said at least one fiber into said at least one passageway of said at least one heat exchanger;
    (c) introducing said coolant gas into said at least one inlet of said at least one heat exchanger;
    (d) delivering at least a portion of said coolant gas from said at least one outlet of the said at least one heat exchanger to said at least one inlet of said at least one heat exchanger;
    (e) controlling a flow of coolant gas into and out of said at least one heat exchanger based on at least one condition at said at least one outlet of said heat exchanger selected from the group consisting of a flow rate of said coolant gas from said at least one outlet of said at least one heat exchanger, a concentration of impurities in said coolant gas from said at least one outlet of said at least one heat exchanger and pressure of said coolant gas from said at least one outlet of at least one heat exchanger to limit air or other gas infiltration into said at least one passageway of said at least one heat exchanger.

2. The process according to claim 1, further comprising cooling said coolant gas from said at least one outlet of said heat exchanger and passing the resulting cooled gas to said at least one inlet of said heat exchanger.

3. The process according to claim 1, further comprising providing sealing means to at least one end of said at least one passageway of said heat exchanger to further reduce air infiltration into said at least one passageway.

4. The process according to claim 1, further comprising filtering said coolant gas from said at least one outlet of said heat exchanger to remove at least one impurity selected from the group consisting of water, oil and particulate from said coolant gas before said coolant gas is delivered to said at least one inlet of said heat exchanger.

5. The process according to claim 1, further comprising purifying said coolant gas from said at least one outlet of said heat exchanger with at least one purification system selected from the group consisting of a pressure swing adsorption system, a thermal swing adsorption system, a membrane gas separation system and a cryogenic gas separation system before said coolant gas is delivered to said at least one inlet of said heat exchanger.

6. The process according to claim 1, wherein said coolant gas contains at least 80% by volume helium.

* * * * *